Oct. 21, 1941.                G. H. KOCH                    2,259,853
                               FAN GUARD
                           Filed Sept. 14, 1938
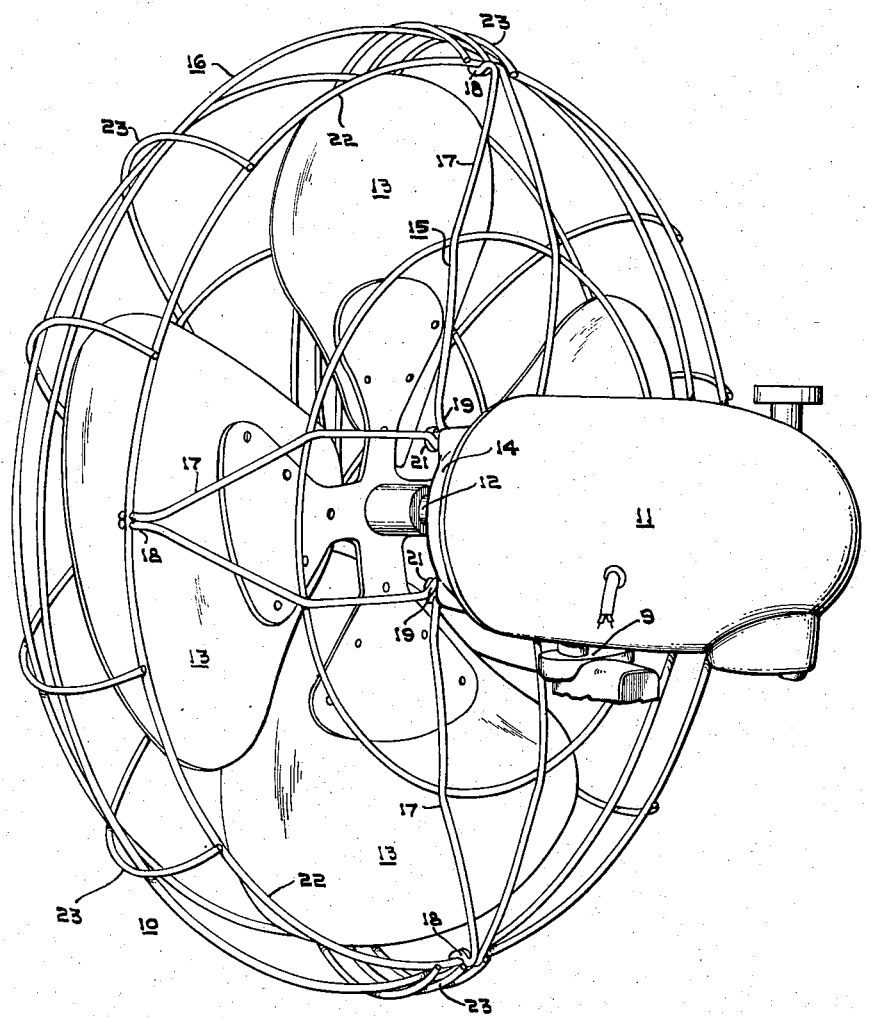
WITNESSES:                                    INVENTOR
                                          GUSTAV H. KOCH.
                                          BY
                                              ATTORNEY Patented Oct. 21, 1941

2,259,853

UNITED STATES PATENT OFFICE 2,259,853

FAN GUARD

Gustav H. Koch, Springfield, Mass., assignor to Westinghouse Electric & Manufacturing Company, East Pittsburgh, Pa., a corporation of Pennsylvania Application September 14, 1938, Serial No. 229,812

4 Claims. (Cl. 230—274)

My invention relates to a guard construction for a motor-driven fan and has for an object to provide an improved construction of this kind.

It is a further object of my invention to provide an improved guard for a fan which may be readily manufactured and assembled to the fan structure.

These and other objects are effected by my invention as will be apparent from the following description and claims taken in accordance with the accompanying drawing, forming a part of this application, in which the single figure of the drawing is a perspective view of a fan guard constructed and arranged in accordance with my invention.

Reference will now be had to the drawing wherein I have shown my improved guard, generally indicated at 10, applied to a fan construction including a motor 11 having a rotatable shaft 12 and blades 13 rotatable with the shaft 12. The motor is provided with an end bell 14 of conventional construction in which the shaft 12 is journaled. The motor 11 may be supported in any well known manner; a support for the motor being partially shown at 9.

In accordance with my invention, the guard 10 is formed of two parts 15 and 16, the former defining a guard support and the latter a guard cage encompassing the blades 13. The guard support 15 is preferably formed of wire of suitable gauge so that a plurality of radially extending arms 17 are defined, each of which arms 17 is provided with a hook or clip 18 at the outer end thereof. Preferably, the clips 18 are integral with the arms 17 and are formed by bending the ends of the wire defining the arms 17 as shown. The portions of the wire defining the inner ends of the arms 17 are looped, as shown at 19, for receiving mounting screws 21 which are preferably threaded in the end bell 14 but which may be threaded in other suitable portions of the fan construction.

The guard cage 16 is preferably formed of round wire of suitable gauge and includes a ring 22 and a plurality of cage wires 23 secured thereto in any well known manner, such as, for example, by welding. In assembling the cage 16 to the support 15, the ring 22 is bowed and forced into the clips 18, it being understood that both the ring 22 and the arms 17 are sufficiently resilient to permit this operation. When assembled, the ring 22 biases the clips 18 and arms 17 inwardly and is, therefore, carried in a substantially rigid manner. The clips 18 are so formed that the ring 22 may be readily forced therein and are biased sufficiently to prevent dislodgment of the ring in service.

From the foregoing, it will be apparent that I have provided an improved two-piece fan guard construction, wherein the guard cage is secured to its support without the use of separate fastening devices. My improved two-piece fan guard construction may be economically manufactured and, in the event of damage to the cage 23 in service, replacement may be more economically and readily effected than where a one-piece guard construction is employed. The support for the guard cage is shown carried by the fan motor end bell but it will be understood that it may be carried by other suitable portions of the fan construction. The specific form of clips for effecting the connection between the cage and support are shown by way of example and it is to be understood that other suitable forms of clips may be employed.

While I have shown my invention in but one form, it will be obvious to those skilled in the art that it is not so limited but is susceptible of various changes and modifications without departing from the spirit thereof, and I desire, therefore, that only such limitations shall be placed thereupon as are imposed by the prior art or as are specifically set forth in the appended claims.

What I claim is:

1. In a guard construction for a fan having a motor and fan blades driven thereby, the combination of a plurality of guard support arms extending in a generally radial direction and attached at their inner ends to said motor, said arms at their outer ends having transversely extending portions formed with recesses opening radially outwardly, and a guard cage for encompassing the fan blades and including a ring adapted to seat in said recesses, said ring being resilient to permit it to be seated in and withdrawn from said recesses by springing the same so that the cage may be mounted on the support arms without separate fastening devices, said ring biasing said transversely-extending portions radially inwardly, at least partly by reason of its resilience, so that it is held firmly in place.

2. A guard construction as set forth in claim 1, wherein the guard support arms are formed of wire, adjacent arms being integrally connected by looped portions of the wire by means of which said arms are attatched to said motor.

3. A guard construction as set forth in claim 1, wherein said recesses are formed by deforming the arms.

4. In a guard construction for a fan having a motor and fan blades driven thereby, the combination of a plurality of guard support arms extending in a generally radial direction and attached at their inner ends to said motor, said arms at their outer ends having transversely extending portions formed with recesses opening radially outwardly, and a guard cage for encompassing the fan blades and including a resilient ring adapted to seat in said recesses, the parts of said guard construction being formed so that said ring is seated in said recesses by bowing said ring and so that when so seated said ring, at least partly by reason of its resilience, biases said transversely extending portions radially inwardly, whereby said ring is held firmly in place.

GUSTAV H. KOCH.